UNITED STATES PATENT OFFICE.

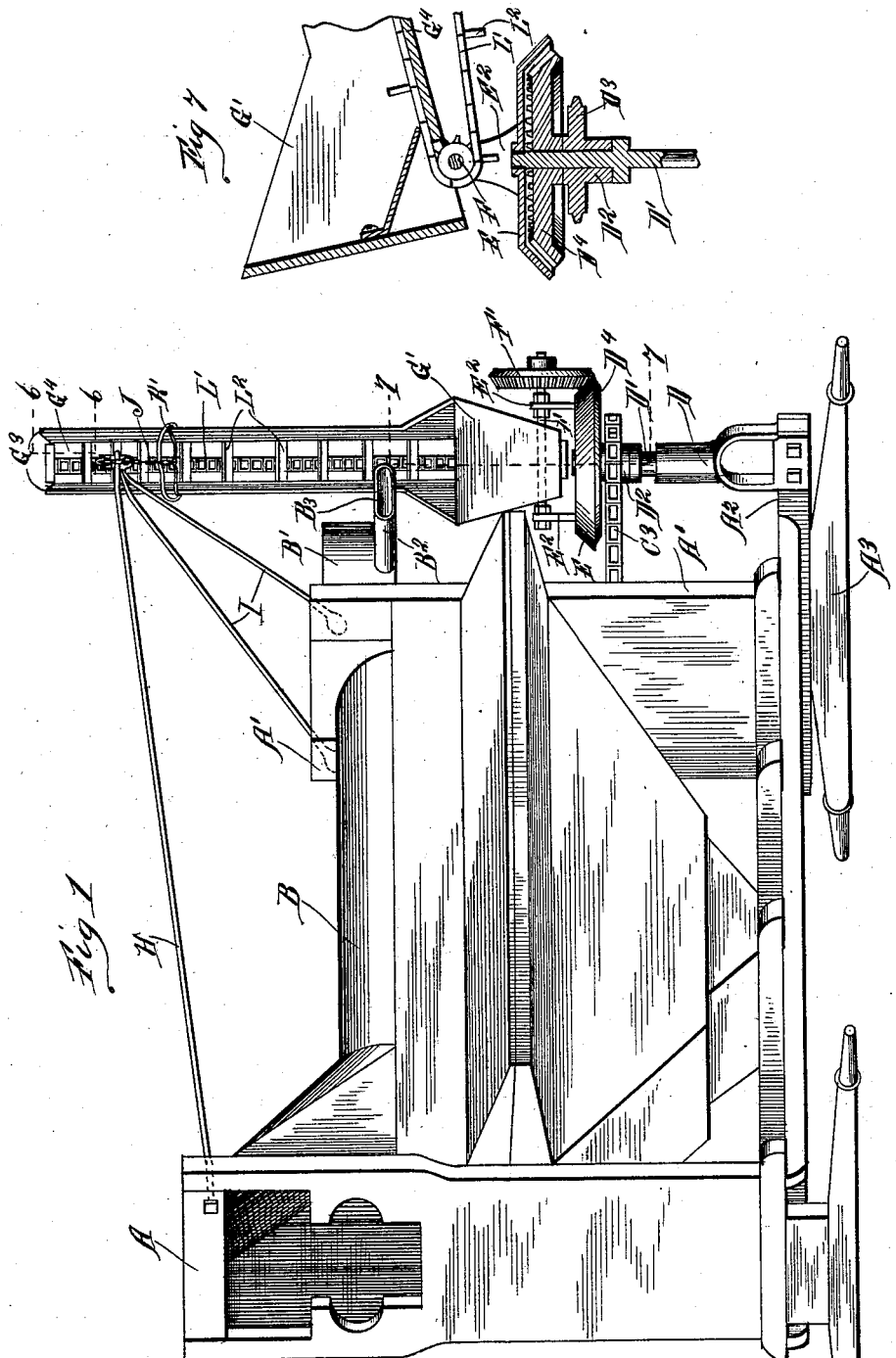

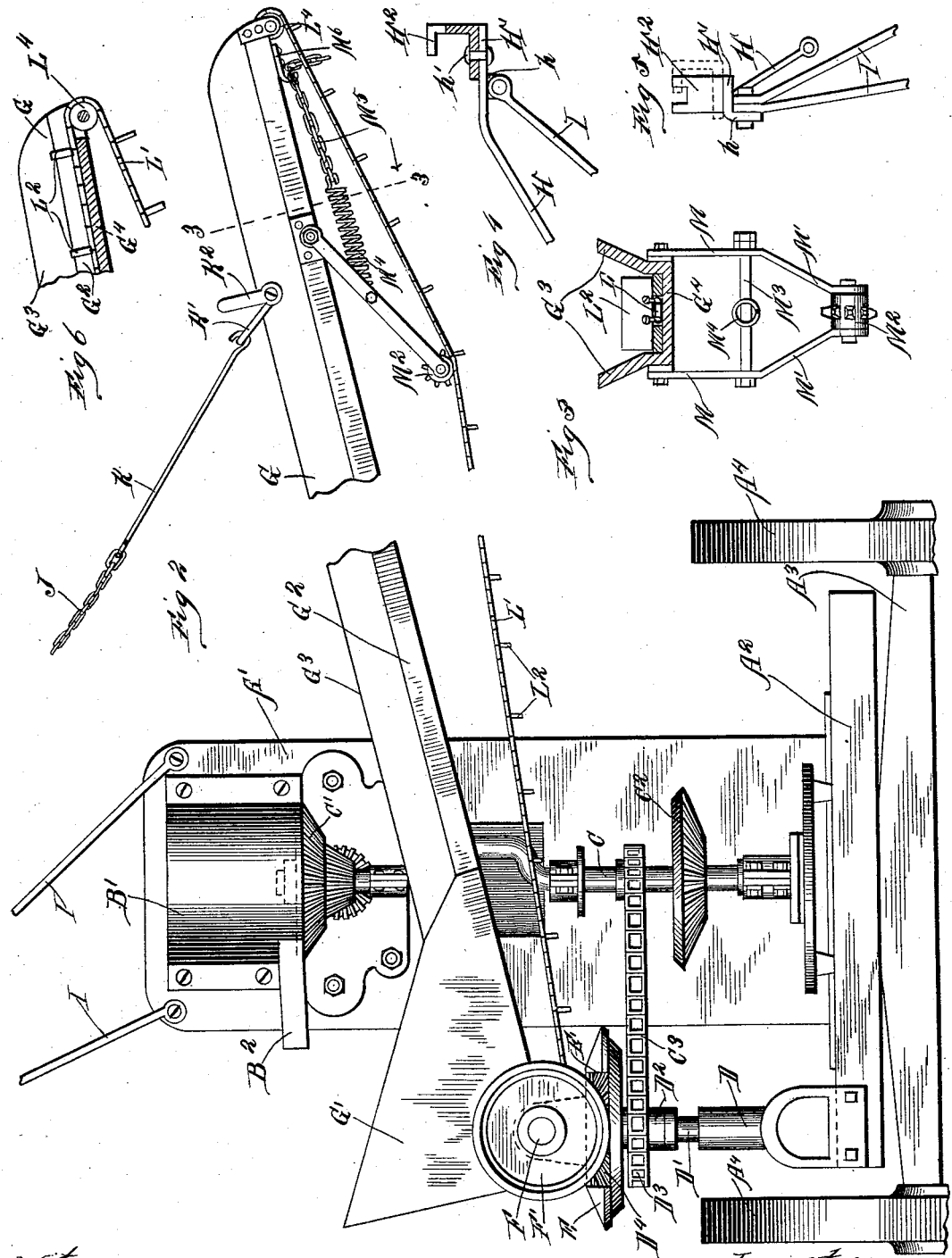

JOHN H. GILMAN, OF OTTAWA, ILLINOIS, ASSIGNOR TO THE KING & HAMILTON COMPANY, OF SAME PLACE.

CORN-SHELLER COB-STACKER.

SPECIFICATION forming part of Letters Patent No. 592,111, dated October 19, 1897.

Application filed March 3, 1897. Serial No. 625,322. (No model.)

*To all whom it may concern:*

Be it known that I, JOHN H. GILMAN, a citizen of the United States, residing at Ottawa, in the county of La Salle and State of Illinois, have invented a certain new and useful Improvement in Corn-Sheller Cob-Stackers, which is fully set forth in the following specification, reference being had to the accompanying drawings, in which—

Figure 1 is a perspective of the principal parts of a corn-sheller embodying my invention, with the wheels removed. Fig. 2 is a front end elevation of such a corn-sheller. Fig. 3 is a vertical cross-section on the line 3 3 of Fig. 2, but with the supports of the stacker omitted. Figs. 4 and 5 are detail views of the cob-stacker support. Fig. 6 is a vertical section on the line 6 6 of Fig. 1. Fig. 7 is a vertical section on the line 7 7 of Fig. 1.

My invention relates to corn-shellers, and more particularly to the cob-stacking mechanism thereof.

It has for its principal object to enable the said mechanism to be easily swung in any direction, and also to render more efficient and less liable to breakage the operation of the endless conveyer forming part of such mechanism.

My invention consists in the form of mounting of the cob-stacker, and in the construction and arrangement of the endless conveyer and of the devices connected therewith.

Referring to the drawings by letter, A represents the rear and A' the front uprights of the main frame, which are mounted upon the platform $A^2$, the axle $A^3$ and wheels $A^4$ supporting the said platform in the usual manner. Between the uprights A and A' is mounted the corn-shelling cylinder B, the forward end of which is connected with a drum B', which itself has an outlet in the chute $B^2$, provided with a mouth, as at $B^3$. The corn-cobs, which pass out of the forward or exit end of the cylinder, are separated from the accompanying chaff in the drum B' and discharged through the chute $B^2$, from which they pass out through the mouth $B^3$ thereof.

In front of the frame-upright A' there is mounted in suitable bearings a vertical shaft C, carrying at its upper end a bevel-gear C', near its lower end a bevel-gear $C^2$, and shortly above the latter a sprocket-wheel (not shown) adapted to drive the sprocket-chain $C^3$. Power may be applied to the shaft C through either one of the bevel-gears C' or $C^2$. Similarly, upon the front of the platform $A^2$ is secured a vertical standard D, in which is mounted a post D'. Upon the said post there is mounted to revolve a sleeve $D^2$, carrying a sprocket-pinion $D^3$, adapted to be driven by the sprocket-chain $C^3$, and carrying, further, a bevel-gear $D^4$, which is thus driven by the sprocket mechanism described. Upon the upper end of the post D' is revolubly mounted a cap E, adapted to cover the top of the bevel-gear $D^4$, but not to contact therewith, and provided with an opening E'. Upon the cap E are formed two upright brackets $E^2$, in which is journaled a short shaft F. The shaft F at one end carries a bevel-gear F', which projects downward through the opening E' in the cap and engages with the bevel-gear $D^4$ and is driven thereby.

The cob-stacker proper, G, comprises a hopper G' and a trough $G^2$, extending upward therefrom, consisting of the inclined sides $G^3$ and bottom $G^4$. The sides of the hopper G' are provided with bearings (not shown) for the shaft F, so that the cob-stacker as a whole may be swung up and down vertically upon the said shaft as a pivot, and may be swung about horizontally by the turning of the cap E upon the post D'.

From the rear frame-upright A there extends forward and upward to a point vertically superimposed over the post D' a brace-rod or tie-rod H, which terminates in the short horizontal bracket H', provided with a perforated ear $h$. Upon this bracket is pivotally mounted the upright hook $H^2$ through the rivet $h'$. Two further brace-rods or struts I extend from opposite sides of the forward frame-upright A' to the bracket H', to which they are riveted through the ear $h$. The chain J is secured near one end at any desired link thereof to the hook $H^2$, and at its other and lower end connects with a rod K, the lower end of which in turn is hooked to a bail K', secured to the sides $G^3$ of the cob-stacker trough near the outer end thereof. These sides are preferably spaced apart at this point by a cross-piece K², as shown. By this construction it will be obvious that the point of support of the outer end of the cob-stacker being made concentric with the point of support of the lower or hopper end, the cob-stacker can be swung about to any desired position, according to the direction in which it is wished to discharge the cobs therefrom. This construction not only facilitates the movement of the cob-stacker during the operation of the machine, but also enables the same to be easily swung to one side when it is desired to move the machine from point to point. The said construction is therefore possessed of distinct advantages as compared with those machines in which the outer end of the cob-stacker is supported from the ground, and the cob-stacker has to be detached and hung to one side of the machine when the machine is to be moved. The employment of the chain J permits the combining of this adjustment with a vertical adjustment of the outer end of the cob-stacker in the simplest manner. By the combination of the two adjustments the outer end of the cob-stacker can be pointed in any direction desired, except in that of the body of the machine.

The conveyer L comprises a sprocket-chain L', carrying at suitable intervals the cross-pieces or shovels L², which travel along the bottom of the conveyer-trough. The sprocket-chain L' is driven by the sprocket-wheel L³, keyed to the shaft F at the lower end of the cob-stacker hereinabove described. At the upper end of the cob-stacker trough is mounted a pulley or roller L⁴, provided with a plain surface, and so not adapted to engage with the sprocket-chain links. To the opposite sides of the cob-stacker trough, near the upper end thereof, are pivoted two arms M, provided with the diagonal branches M', in the lower ends of which is journaled an idle sprocket-pinion M². The pivoted arms M are further connected by a cross-piece M³, to which is secured one end of a contracting spiral spring M⁴. To the other end of the spring is secured one end of the chain M⁵, one of the links near the opposite end of which engages with the hook M⁶, secured to the bottom of the cob-stacker trough.

Heretofore it has been common to run the sprocket-chain of the conveyer over a sprocket-wheel at the upper and outer end of the cob-stacker trough. It has frequently resulted from this construction that cobs become caught between the sprocket-chain and the said sprocket-wheel, resulting in throwing the chain off the wheel, and so disorganizing the conveyer, or often in the breaking of the chain itself. By the construction hereinabove described there is less tendency for corncobs to be caught between the sprocket-chain and the smooth-faced pulley over which the chain runs at the upper end of the cob-stacker. Even if cobs are so caught, the chain is not thrown out of gear with any such sprocket-wheel, while all breaking of the chain from such a cause is avoided by the elastic tension devices described—viz., the idle sprocket-pinion M² and the mechanism adapted to hold the same yieldingly outward. Finally, by the construction shown the amount of tension upon the sprocket-chain through this idle-pinion may be adjusted to any degree desired through the chain M⁵.

Having thus described my invention, what I claim, and desire to secure by Letters Patent, is—

1. The combination of the cap E rotatably mounted on the vertical post D' and carrying the shaft F journaled therein, with the stacker G pivotally mounted at its lower end upon said shaft, the tie-rod H and struts I forming a point of support vertically over the post D', and means including the pivoted hook H² connecting the outer end of the stacker with the said point of support whereby the stacker may be swung freely in a horizontal plane.

2. The combination of the cap E rotatably mounted on the vertical post D' and carrying the shaft F journaled therein, with the stacker G pivotally mounted at its lower end upon said shaft, the tie-rod H and struts I forming a point of support vertically over the post D', the pivoted hook H² mounted upon said point of support, and means for connecting the upper end of the cob-stacker with the said hook, comprising the chain J adapted to be secured at any desired link to the hook H².

3. The combination of the cap E rotatably mounted on the vertical post D' and carrying the shaft F journaled therein, with the stacker G pivotally mounted at its lower end upon said shaft, the tie-rod H secured to the rear of the corn-sheller frame, terminating in a bracket H', the struts I secured to the forward portion of the corn-sheller frame and connected with the bracket H', the hook H² pivotally mounted upon the said bracket at a point vertically over the post D', and means for connecting the said hook H² with the outer end of the stacker, comprising a chain J adapted to be hooked at any desired link to the hook H².

4. In a cob-stacker, the sprocket-wheel journaled at the lower end thereof; the endless conveyer comprising the shovels L² and sprocket-chain L', adapted to be driven from the said sprocket-wheel; the roller L⁴, over which the said conveyer passes, mounted at the upper end of the cob-stacker; the idle-pinion M² mounted in the arms M, pivoted to the cob-stacker beneath the same; and adjustable tension mechanism connecting the said arms with the cob-stacker and adapted to force the pinion M² yieldingly outward and downward against the said sprocket-chain.

5. In a cob-stacker, the sprocket-wheel journaled at the lower end thereof; the endless conveyer comprising the shovels $L^2$ and sprocket-chain $L'$, adapted to be driven from the said sprocket-wheel; the roller $L^4$, over which the said conveyer passes, mounted at the upper end of the cob-stacker; arms M pivoted to the cob-stacker, provided with a cross-piece $M^3$; the idle-pinion $M^2$ mounted in the lower ends of the said arms; the contracting spring $M^4$, at one end connected to the cross-piece $M^3$; and a chain $M^5$ at one end connected to the spring $M^4$, at its other end hooked at any given link to the hook $M^6$ mounted upon the cob-stacker.

JOHN H. GILMAN.

Witnesses:
S. E. KING,
EDW. R. CLAUS.